G. W. BOLLENBACHER
KITCHEN SAFE.
No. 172,909. Patented Feb. 1, 1876.
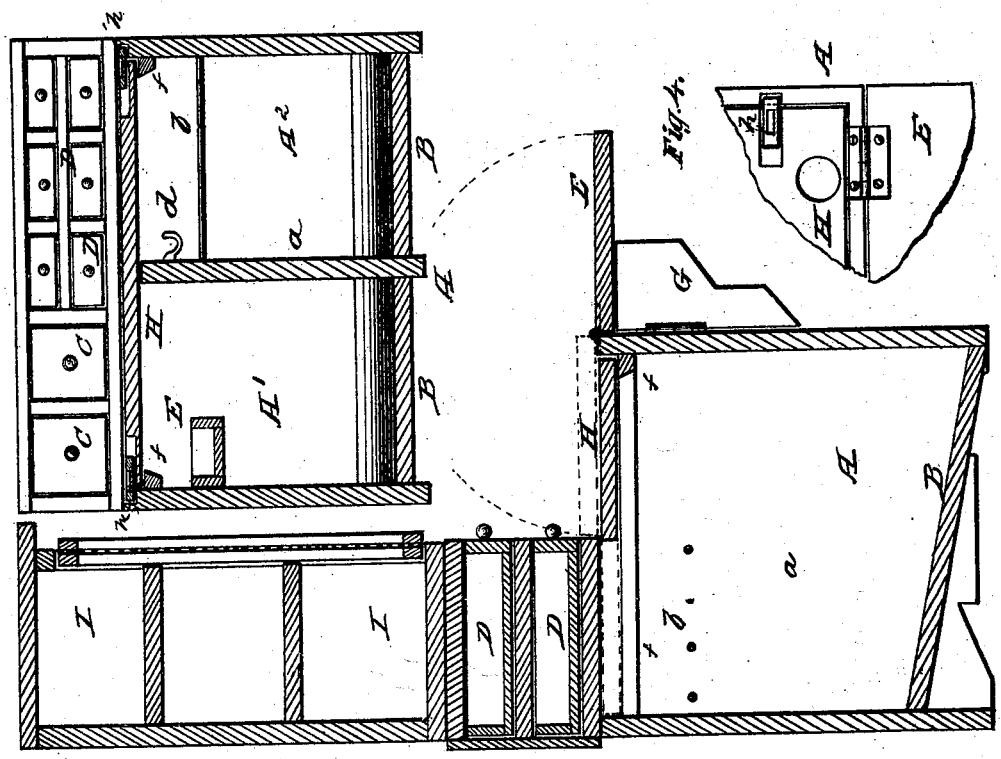

UNITED STATES PATENT OFFICE.

GEORGE WASHINGTON BOLLENBACHER, OF BLOOMINGTON, INDIANA.

IMPROVEMENT IN KITCHEN-SAFES.

Specification forming part of Letters Patent No. 172,909, dated February 1, 1876; application filed July 17, 1875.

*To all whom it may concern:*

Be it known that I, GEO. W. BOLLENBACHER, of Bloomington, in the county of Monroe and State of Indiana, have invented certain new and useful Improvements in Kitchen-Safes; and I do hereby declare that the following is a full, clear, and exact description thereof, reference being had to the accompanying drawings, and to the letters of reference marked thereon, which form part of this specification.

The nature of my invention consists in the construction and arrangement of a combined flour and meal chest, drawer, and safe, as will be hereinafter more fully set forth.

In order to enable others skilled in the art to which my invention appertains to make and use the same, I will now proceed to describe its construction and operation, referring to the annexed drawing, in which—

Figure 1 is a front view of my invention. Fig. 2 is a transverse vertical section of the same. Fig. 3 is a longitudinal section of the lower part thereof. Fig. 4 is a plan view, showing one corner of the flour and meal chest.

A represents a chest, of any suitable dimensions, divided, by means of a central transverse partition, $a$, into two compartments, $A^1$ and $A^2$, one for flour and the other for meal. The bottom B of the chest is made inclined forward, so that the scoop can easily be used to take up even to the last remnants of the contents therein. In the bin $A^2$ is a grating, $b$, upon which to place the scoop, and hooks $d$ $d$ to receive the rolling-pin. In the other bin $A^1$ is a trough or box, $e$, to receive such articles as may be desired to be placed therein. Over the rear part of the chest A, and extending the entire length thereof, is a case containing large drawers C C, for coffee and sugar, and a series of small drawers, D, for knives, forks, spoons, spices, and such other articles as may be desired to be kept therein. The top of the chest A, in front of the case of drawers, is provided with a hinged lid or top, E, which, when opened, is supported upon hinged leaves G G, as shown. Under the lid or top E in the top of the chest A is a cake-board, H, resting upon cleats $f$ in the chest A, and which can be moved under the drawer-case, to gain admittance into the bins below, or be moved forward to close the same, and then form a part of the table, of which the opened lid E forms the other part. When thus placed, the board H is held in position by a sliding bolt, $h$, at each end. On top of the drawer-case is a safe, I, constructed in any suitable manner, and made entirely separate from the chest and drawers.

Having thus fully described my invention, what I claim as new, and desire to secure by Letters Patent, is—

The improved kitchen-safe A, having a central partition, $a$, dividing it into bins $A^1$ and $A^2$, sliding shelf H, and hinged top E, said shelf H being provided with bolts $h$, and adapted to be drawn forward and locked in place to form a continuous surface with the unfolded top E, or pushed back to cover the bins in connection with said top when folded, substantially as set forth.

In testimony that I claim the foregoing as my own I affix my signature in presence of two witnesses.

GEO. W. BOLLENBACHER.

Witnesses:
 HENRY HENLY,
 A. R. HOWE.